United States Patent
Holtmann et al.

(10) Patent No.: US 12,466,768 B2
(45) Date of Patent: Nov. 11, 2025

(54) LIGHTWEIGHT COMPOSITE MATERIAL HAVING A SCRATCH-RESISTANT SURFACE AND METHOD FOR THE PRODUCTION THEREOF

(71) Applicant: Gebrüder Dorfner GmbH & Co. Kaolin—und Kristallquarzsand-Werke KG, Hirschau (DE)

(72) Inventors: Klaus Holtmann, Amberg (DE); Marco Süss, Bodenwöhr (DE); Kirstin Heyen, Hahnbach (DE)

(73) Assignee: GEBRÜDER DORFNER GMBH & CO. KAOLIN—UND KRISTALLQUARZSAND-WERKE KG, Hirschau (DE)

( * ) Notice: Subject to any disclaimer, the term of this patent is extended or adjusted under 35 U.S.C. 154(b) by 718 days.

(21) Appl. No.: 17/612,506

(22) PCT Filed: Mar. 31, 2020

(86) PCT No.: PCT/EP2020/059116
§ 371 (c)(1),
(2) Date: Nov. 18, 2021

(87) PCT Pub. No.: WO2020/233880
PCT Pub. Date: Nov. 26, 2020

(65) Prior Publication Data
US 2022/0212987 A1    Jul. 7, 2022

(30) Foreign Application Priority Data
May 20, 2019    (DE) ..................... 10 2019 113 330.0

(51) Int. Cl.
| C04B 14/16 | (2006.01) |
| C04B 14/06 | (2006.01) |
| C04B 26/06 | (2006.01) |
| C04B 26/16 | (2006.01) |
| C04B 26/18 | (2006.01) |
| C04B 103/00 | (2006.01) |
| C04B 111/00 | (2006.01) |
| C04B 111/60 | (2006.01) |

(52) U.S. Cl.
CPC .............. *C04B 14/16* (2013.01); *C04B 14/06* (2013.01); *C04B 26/06* (2013.01); *C04B 26/16* (2013.01); *C04B 26/18* (2013.01); *C04B 2103/0043* (2013.01); *C04B 2111/00405* (2013.01); *C04B 2111/60* (2013.01)

(58) Field of Classification Search
None
See application file for complete search history.

(56) References Cited

U.S. PATENT DOCUMENTS

2009/0110909 A1* 4/2009 Innocenzo ........... H05K 3/4655
428/323

FOREIGN PATENT DOCUMENTS

| DE | 102004021425 A1 | 11/2005 |
| EP | 1706448 B1 | 10/2006 |
| EP | 3319924 B1 | 5/2018 |
| JP | 2001132137 A | 5/2001 |
| PL | 227566 B1 | 12/2017 |

OTHER PUBLICATIONS

Office Action mailed Aug. 23, 2022 in corresponding German Patent Application 10 2020 108 862.0.
International Search Report and Written Opinion mailed Nov. 26, 2020 in corresponding International Patent Application PCT/EP2020/059116.
Notification pursuant to Article 94(3) EPO, for corresponding application No. EP 20 717 128, dated Feb. 17, 2023.

* cited by examiner

*Primary Examiner* — Sheeba Ahmed
(74) *Attorney, Agent, or Firm* — LEYDIG, VOIT & MAYER, LTD.

(57) ABSTRACT

The present invention relates to a lightweight composite material having a binder and at least one first and at least one second filler, the first filler having a density of >2 kg/l and a Mohs hardness of >4 and the second filler having a bulk density of <2.5 kg/l. The concentration of the first filler in the composite material decreases starting from a first surface of the composite material in the direction of an opposite second surface of the composite material. In addition, the invention relates to a method for producing a composite material. This method includes the steps of providing a first filler which has a density of >2 kg/l and a Mohs hardness of >4, and providing a second filler which differs from the first filler and has a bulk density of <2.5 kg/l, and setting a concentration of the first filler in the resin that decreases in the vertical direction from a base surface of the casting mould by utilising the different mobilities of the filler particles in the resin.

20 Claims, 3 Drawing Sheets

LIGHTWEIGHT COMPOSITE MATERIAL HAVING A SCRATCH-RESISTANT SURFACE AND METHOD FOR THE PRODUCTION THEREOF

CROSS-REFERENCE TO RELATED APPLICATIONS

This application is a U.S. National Stage Application filed under 35 U.S.C. § 371 of International Application No. PCT/EP2020/059116, filed Mar. 31, 2020, which claims the benefit of German Application No. 10 2019 113 330.0, filed May 20, 2019. Both of these applications are hereby incorporated by reference in their entireties.

The present invention relates to a lightweight composite material having a scratch-resistant surface and to a method for producing such a composite material.

Composite materials are known from the prior art which can be used in many fields. Important fields of application for composite materials, for example made of mineral goods, are coatings of floor or wall surfaces and sanitary products such as wash basins, shower trays or kitchen sinks. Composite materials are also increasingly being used in furniture construction. In particular when using composite materials as a work surface, for example in a kitchen, high demands are placed on the composite material with regard to its load-bearing capacity. In these regions, composite materials are exposed to high mechanical and thermal loads. In addition, they are usually very visible, so that they should also have an attractive appearance over the long term. The visible surface should have a surface roughness that is as variable as possible, be as pore-free as possible and easy to clean. In addition, it should permanently retain this property and not be damaged during chores in the kitchen, for example. In particular, damage to the surface caused by cuts is supposed to be avoided.

In the past, acrylate-bonded or polyester-bonded composite materials which can be given desired visual surface properties by means of partially coloured fillers such as granules or mixtures of granules having effect pigments were increasingly used for these applications. Composite materials of this type consist, for example, of coloured quartz sand in a polymer matrix of, for example, polyester, acrylic resin or PU resin. These composite materials usually contain between 60 and 80 wt. % mineral filler of various grain sizes. These materials are usually produced using a casting method. For this purpose, a mixture of mineral filler and polymer binder is mixed and then filled into a mould made of metal or GFRP, for example. The polymer hardens in this mould, and the composite material is created in its final shape.

In the case of composite materials of this type, surfaces which have a granite-like or sandstone-like appearance are of particular interest. In order to be able to develop an appearance of this type, colour sand mixtures of different colours are preferably used as fillers or pigments are added to the binder. The "solid surface" method has been established as a method that is particularly well suited for the production of composite materials of this type. In this one-step method, a mixture of inorganic fillers is mixed with an organic binder and filled directly into a casting mould in which the compound hardens. The composite materials produced in this way are coloured in their entirety, so that they offer the advantage that there are no clearly discernible colour differences even if the surface flakes off. Aluminium trihydroxide (ATH) and acrylic resin or polyester resin have been established as common materials that can be used in this method. Mixtures of cristobalite and acrylic resin among others, also referred to as quaryl, have also been established. Composite materials of this type are usually homogeneous in colour. Granite-like/sandstone-like structures are produced from the same type of composite material by adding coloured granules of different sizes and colours. The granules have no influence on the mechanical properties.

In addition to the demands for the scratch and cut resistance of the surfaces (e.g. DIN 68861-4), high demands are placed on composite materials of this type with regard to the resistance to temperature changes. Changes in colour or deformations should, for example, not occur, if possible, when putting down a pot that is still hot (e.g. DIN EN ISO 19722-2).

In addition to the production method described above, what is referred to as the Breton method is also known from the prior art for panel-shaped workpieces such as worktops and wall panels. The mineral filler, mostly based on quartz, is usually mixed with a polymer in a weight proportion of >80% and, after being filled into a mould, is compacted in a pore-free manner by mechanical pressure. The polymer hardens in the mould, so that the moulded composite material can then be removed.

In this method, however, instead of individual panels of a predetermined thickness, a cuboid mould is first filled with a mixture of selected minerals (e.g. quartz) and polymer material and compressed in a pore-free manner by mechanical pressure for particular visual effects. After the polymer has hardened in the cuboid shape, panels of a defined thickness are sawn from the resulting composite material cuboid, similar to the processing of natural stone, and then subjected to post-treatment. In particular, mechanical polishing is necessary in order to obtain the desired surface properties.

The mechanical load-bearing capacity of the surface is substantially determined by the selection of fillers. When using hard minerals (for example of a Mohs hardness of >5) such as quartz, the composite materials produced by the method described above usually have an abrasion of less than 30 mg per 100 cycles measured according to the Taber Abrasion method (DIN EN 13310). Higher proportions of mineral fillers and larger mineral particles usually have a positive effect on the abrasion behaviour. In contrast, the selection of the binder has less of an influence on the abrasion resistance.

Disadvantages of the materials known from the prior art with high abrasion resistance are in particular the high density of the composite materials and the limited possibility of post-processing, which—if at all—is only possible with special tools.

The density of such a composite material increases with the proportion of mineral fillers and results in the high degrees of filling which are required for the desired surface resistance with, for example, quartz to a density of the composite material of approximately 2.2 to 2.5 kg/l. One square meter of a worktop that is only 10 mm thick therefore weighs around 25 kg. In particular in the case of larger components such as those used in furniture construction and in particular in (kitchen) worktops, a plurality of fitters or mechanical aids are therefore required for on-site assembly.

Moreover, components of this type can no longer be subjected to post-processing on site using conventional tools. As a result, the components must already be cut to the final dimensions using stone processing tools, through holes must be drilled and recesses (for example to insert a kitchen sink or stove) must be introduced prior to the transport to the job site. This makes assembly much more difficult and is associated with long lead times and complex logistics.

The object of the invention is therefore that of providing a composite material and a method for the production thereof which does not have the disadvantages described above and can be produced in a simple, inexpensive and one-step process, if possible in GRP moulds which are also inexpensive or on or between glass panels, preferably made of single-pane safety glass. Such a composite material should be able to be post-processed well and, if possible, using conventional tools, and at the same time be scratch and abrasion resistant.

Said material should have a high mechanical resistance and, for example, an abrasion, which is determined as material loss in the Taber Abrasion Test, of <30 mg per 100 cycles. Additionally or alternatively thereto, the scratch hardness according to DIN 68861-4 should be in the range of ≥1.5 to ≤2 N if possible.

Moreover, the demands specified by DIN 68861 and/or DIN EN ISO 19722 for worktops should be complied with.

The density of the composite material should be less than 2 kg/l, preferably in the range of between 1.2 and 1.5 kg/l if possible.

The reworking at the installation site should be possible using tools such as those commonly used for example by carpenters, tilers or plumbers. Processing should be possible in a dry state, i.e. preferably without water cooling, and no flying sparks should occur during mechanical processing (e.g. sawing).

In terms of the method, it should be possible to produce such a composite material as simply as possible. In particular, a one-step method is preferred which manages without a step of subsequently applying a hard or hardening surface coating.

This object is achieved by a composite material which comprises at least one binder and at least one first and at least one second filler, the first filler having a density of >2 kg/l and a Mohs hardness of >4, preferably >4.5, more preferably >5 and the second filler having a bulk density of <2.5 kg/l, preferably <1.5 kg/l, preferably <1 kg/l, preferably <0.8 kg/l, preferably <0.6 kg/l, more preferably <0.5 kg/l, particularly preferably <0.4 kg/l, most preferably <0.3 kg/l, more preferably <0.2 kg/l. The composite material according to the invention is furthermore in particular characterised in that the concentration of the first filler in the composite material decreases starting from a first surface of the composite material in the direction of an opposite second surface of the composite material. This decrease can be described by a continuous function. The decrease in the concentration of the first filler in the composite material starting from the first surface in the direction of the opposite second surface preferably follows this continuous function. This function can have a straight course or be curved. This function is preferably an exponential function, in particular having a base <1. The particles of the first and of the second filler preferably have at least one property which allows separation or at least enrichment or depletion within specific regions of the composite material before it is hardened.

The concentration of the second filler in the composite material preferably increases at least in portions starting from this first surface of the composite material in the direction of the opposite second surface of the composite material. In this context, "at least in portions" should mean that this increase does not have to run over the entire distance between the two surfaces of the composite material. Rather, it would be conceivable that the concentration of the second filler in the composite material is constant in some regions. For example, in the region of one of the surfaces mentioned, the concentration of the second filler could be equal to 0 and the second filler only occurs after a specific distance from this first surface. Furthermore, it would be conceivable that the concentration of the second filler reaches a saturation value $c_{max}$ starting from a specific distance from the first surface and thus the concentration does not increase any further with increasing distance from the first surface. However, it is preferred that the increase in the concentration of the second filler in the composite material starting from the first surface of the composite material in the direction of the opposite second surface of the composite material can be described by a continuous function. The increase in the concentration of the second filler in the composite material starting from the first surface in the direction of the opposite second surface preferably follows this continuous function. This function can have a straight course or be curved. This function is preferably a logarithm function, in particular having a base >1.

A continuous decrease in the concentration of the first filler in the composite material starting from a first surface of the composite material in the direction of an opposite second surface of the composite material is also referred to below as a (concentration) gradient. Analogously to this, the continuous increase in the concentration of the second filler in the composite material in a region between the first surface of the composite material and the second surface of the composite material in the direction of the second surface is referred to as a gradient.

The first and the second surface are preferably the surfaces of the composite material which have the largest surface. The first and the second surface are preferably flat, but can also have a curvature, for example rounded edges, in partial regions in the flat configuration. The first and the second surfaces of the composite material preferably extend (at least substantially) in parallel with one another. The first surface preferably forms the visible side (for example in the case of furniture or worktops). In the region of this first surface, the concentration of the denser first filler is greater than in the region of the second surface.

The surfaces of the composite material, in particular the first and/or the second surface, can be smooth or structured (for example similar to slate) independently of one another.

A composite material preferably has a substantially cuboid geometry. Since the use of such a composite material as a (kitchen) worktop is particularly preferred, such a cuboid has a significantly smaller extension in one direction, preferably in the height direction, than in the other two directions, namely the length direction and the width direction. In particular, it is preferred that the extension in the height direction is less than 10% of each of the two other directions. In particular, an extension of the composite material in the height direction of ≤10 cm, preferably ≤7 cm, preferably ≤6 cm, particularly preferably ≤5 cm, preferably ≤4 cm, particularly preferably ≤3 cm is provided. It is preferred that the composite material is designed as a panel and particularly preferably has a thickness (height) of from 1 to 5 cm.

It is preferred that the (concentration) gradient of the first filler in the composite material extends along a (height) direction in which the composite material has a minimal extension. When using such a composite material as a worktop, for example, it is particularly preferred that the concentration of the first filler in the composite material is highest on an upper surface and decreases from there in the direction of the lower surface of the worktop. In this state, the concentration of the second filler in the composite material is lowest on an upper surface and increases from there in the direction of the lower surface of the worktop.

A composite material as described above preferably has an isotropic granular material as filler and a resin which is viscous (before hardening).

The viscosity of the resin or binder (the terms resin and binder are used synonymously in the scope of this invention) is preferably ≥25 mPa·s, preferably ≥50 mPa·s, preferably ≥100 mPa·s, particularly preferably ≥250 mPa·s, particularly preferably ≥300 mPa·s, for some applications even ≥500 mPa·s or ≥750 mPa·s. Additionally or alternatively, the viscosity of the resin is preferably ≤10,000 mPa·s, preferably ≤5,000 mPa·s, preferably ≤1,200 mPa·s, particularly preferably ≤750 mPa·s, particularly preferably ≤500 mPa·s. The viscosity of the resin as indicated above is preferably present at least at the point in time of filling into a casting mould. In particular when using an acrylic resin, a viscosity of approximately 300 mPa·s (±100 mPa·s) is preferred, and when using a polyester resin, a viscosity of ≥300 to ≤1200 mPa·s (each ±100 mPa·s) is preferred, the low viscosities of the respective ranges in particular being preferred. When using a PU resin, a viscosity of ≥300 to ≤1200 mPa·s (in each case ±100 mPa·s) is also preferred, in this case too, in particular, the selection of a viscosity from the lower subrange, i.e. between approximately 300 and 800 mPa·s, particularly preferably between 300 and 500 mPa·s, being preferred.

By the point in time at which the gel point is reached (at which the resin takes on the properties of a solid and has a modulus of elasticity), a viscosity in one of the ranges defined above allows the first and second fillers to have a specific mobility within the binder and to enrich or deplete in specific regions of the casting mould according to their density. To this end, the particles of the first filler and the particles of the second filler differ in at least one property which allows separation and/or enrichment or depletion within predetermined regions of the composite material before it is hardened. The distinguishing property is preferably selected from a group comprising density, grain size (SediGraph), morphology and contact angle to the binder. The, for example, denser particles of the first filler will, due to the force of gravity, preferably collect in the lower region of the casting mould, while the particles of the second filler of lower density and/or smaller grain sizes are preferably arranged in the upper region of the casting mould. After the composite material has hardened in the casting mould, it has a higher concentration of the particles of the first filler on the underside, whereas the concentration of the particles of the second filler is higher in the upper region. A local enrichment or depletion of the particles of the first filler and the particles of the second filler using parameters which are independent of the density, such as the grain size, is particularly preferred in the case of composite materials having a homogeneous surface colour. If, for example, a homogeneously white worktop is desired, a fine-grained ATH could be used as the second filler, and a coarser-grained first filler such as cristobalite could be used, for example. The first filler is particularly preferably opaque white.

Due to the higher concentration of the harder and denser or coarser particles of the first filler on one side, the composite material has a greater density and/or hardness in this region than on the other side. This harder side is created during the casting process on the underside of the casting mould. In the state of use, for example as a (kitchen) worktop, however, this side is often the top or the visible side. Since this side rests against the (preferably flat) underside of the casting mould during hardening and is pressurized by the casting compound above, said side is usually very smooth and has excellent visual properties even without post-processing. Any desired post-treatment, for example polishing or applying a gloss agent, is optional (e.g. after a repair), but is usually not necessary. It is thus possible to produce a composite material in a one-step process which has a surface layer having the desired visual properties and the desired abrasion resistance. Due to the only local enrichment of the first filler particles and the enrichment of the second filler particles in the other regions facing away from the visible surface, the composite material is characterised overall by a low density and easy mechanical processability.

In addition to a one-step production process, another advantage of the continuous course of the concentration gradient is a minimisation of the (local) difference in the coefficient of thermal expansion along the height of the composite material. In contrast to a two-layer sandwich structure, for example comprising a cover layer, adhesive bond and substrate, there is preferably no region in the composite material described above in which a sudden change in the coefficient of thermal expansion occurs. Such a region could result in what is referred to as a "bimetal" effect. The consequence of this would be that during the cooling and hardening of the binder, in particular in the case of thin panels having a low bending moment, deformation of the panels could occur. Even if the deformation could be counteracted, at least one shear stress on the boundary layer would still occur in the region of the sudden change in the coefficient of thermal expansion, as a result of which delamination could occur in the long term. A related long-term resistance could be determined, for example, by measuring the temperature resistance in accordance with the test standard AMK-MB-01.

It has surprisingly been found in the experiments that over the gradual course of the change in concentration of at least the first filler particles (possibly by setting a suitable viscosity of the binder, the filler-binder mixture or setting the gel time), the deformation of the composite material due to different shrinkage during polymerisation can be completely avoided or at least almost eliminated. The bimetal effect described above thus does not occur or occurs only to a minimal extent.

A sudden change in the coefficient of thermal expansion can particularly preferably be avoided by achieving a gradual transition between the abrasion-resistant layer and the substrate, and the degree of filling of the composite material being at least substantially constant due to the increase in the concentration of the second fillers over the height of the composite material. The shrinkage of the binder during its polymerisation is thus substantially the same in all regions of the composite material, so that this does not promote any deformation.

In a preferred embodiment, the particles of the first filler are selected from a group consisting of quartz, calcium carbonate (less preferred due to its low resistance to acids), ATH (less preferred since its Mohs hardness of approximately 3 is comparatively soft), nesosilicates and structural silicates (e.g. feldspar), cristobalite, aluminium oxide, silicon carbide and haematite. These have proven to be particularly suitable due to their high hardness and high density.

The first filler preferably has a particle size ($d_{50}$ SediGraph) of ≥0.5 μm, preferably ≥1 μm, preferably ≥2 μm, preferably ≥3 μm, particularly preferably ≥5 μm, preferably ≥10 μm, preferably ≥20 μm. Additionally or alternatively thereto, it is preferred that the first filler has a particle size ($d_{50}$ SediGraph) of ≤1000 μm, preferably ≤500 μm, preferably ≤200 µm, preferably ≤100 µm, preferably ≤50 µm, preferably ≤20 µm, preferably ≤10 µm.

In a preferred embodiment, the particles of the second filler are selected from a group comprising hollow polymer spheres, polymer granules (e.g. PE, PP, recyclates), hollow glass spheres, synthetic porous glass or ceramic spheres (e.g. Poraver), zeolite, ATH, expanded perlite and pumice stone. Inorganic materials are particularly preferred as the second filler. The above-mentioned materials have proven to be particularly suitable due to their sufficient hardness and low density. The (Mohs) hardness of the particles of the second filler is preferably ≥2 and additionally or alternatively ≥4, preferably in the range of from 2.5 to 3.5 (marginal values included in each case).

The second filler preferably has a particle size ($d_{50}$ SediGraph) of ≥1 µm, preferably ≥2 µm, particularly preferably ≥5 µm, more preferably ≥10 µm, preferably ≥20 µm, preferably ≥50 µm, preferably ≥100 µm. Additionally or alternatively thereto, it is preferred that the first filler has a particle size ($d_{50}$ SediGraph) of ≤2000 µm, preferably ≤1000 µm, preferably ≤500 µm, preferably ≤200 µm, particularly preferably ≤100 µm, preferably ≤50 µm, preferably ≤20 µm, preferably ≤10 µm.

The binder preferably has a density which is between the density of the first and second fillers. In particular, it is preferred that the binder has a density of ≥0.8 kg/l, preferably ≥0.9 kg/l, preferably ≥1 kg/l, preferably ≥1.1 kg/l, preferably ≥1.2 kg/l, and additionally or alternatively ≤1.7 kg/l, preferably ≤1.6 kg/l, preferably ≤1.5 kg/l, preferably ≤1.4 kg/l, preferably ≤1.3 kg/l, preferably ≤1.2 kg/l, preferably ≤1.1 kg/l. With these densities, it was possible to achieve a particularly good enrichment or depletion of the respective fillers in the different regions along the height extension of the composite material.

Tests have shown that both hollow polymer spheres and hollow glass spheres are suitable. It has been shown, however, that hollow polymer spheres in particular cannot contribute to strengthening the mechanical load-bearing capacity of the composite material, but rather are to be viewed as pores in the composite material that reduce its strength. Hollow glass spheres have also proven to be less preferred, since with those made of soda-lime glass or E-glass there is a risk of corrosion in the matrix due to moisture diffusing in, which can result in destruction of the composite. Hollow glass spheres made of corrosion-resistant glass such as borosilicate glass do not have this problem but are usually uneconomical due to their high purchase price.

Hollow glass spheres generally have the problem that they can easily be destroyed under mechanical load, such as can occur during mixing. This has proven to be disadvantageous in particular when hard first fillers are used at the same time.

For these reasons, natural mineral fillers having a low density, for example expanded perlite or pumice stone, are particularly preferred as second fillers. These contain larger amounts of aluminium oxide and are therefore also very stable against corrosion by alkaline solutions having a high pH value or water. Another advantage is the structure of these natural raw materials, which is similar to a closed-cell foam. The (cell) walls of these raw materials can be understood as very thin layers of glass. Despite a Mohs hardness of approximately 3, "glass foams" of this type are easy to process mechanically, as the layers break under mechanical load at specific points (e.g. when sawing). Since the pores are closed and, moreover, have an average size (diameter) of only a few µm, the penetration of moisture into the particles of the second filler is prevented. The grain strength of these fillers is high. Accordingly, they can also transfer mechanical loads in the composite material.

In a preferred embodiment, the composite material has a proportion by volume of fillers of ≥40%, preferably ≥45%, particularly preferably ≥50%, preferably ≥60%, preferably ≥70% and additionally or alternatively ≤80%, preferably ≤70%, preferably ≤60%, preferably ≤55%, preferably ≤50%. A proportion by volume of the fillers in this range has proven to be advantageous, since in this way the proportion of the cost-intensive binder can be minimised, but at the same time sufficient strength and crosslinking can be ensured by the binder. In this proportion, the filler particles in the polymer matrix can still move past one another without high friction.

An embodiment is preferred in which the first and the second filler have a different average particle size ($d_{50}$ SediGraph). It is particularly preferred that the average particle size ($d_{50}$ SediGraph) of the second filler is greater than the average particle size ($d_{50}$ SediGraph) of the first filler. In particular, it is preferred that the average particle size ($d_{50}$ SediGraph) of the second filler is larger by a factor of ≥1.5, preferably ≥2, particularly preferably ≥5, more preferably ≥10 and/or is larger by ≥1 µm, preferably ≥2 µm, particularly preferably ≥5 µm, more preferably ≥10 µm, preferably ≥20 µm, preferably ≥50 µm than the average particle size ($d_{50}$ SediGraph) of the first filler. As a result of such a different grain size distribution of the first and second fillers, the particles of the second filler form cavities in the composite material that can be occupied by the smaller particles of the first filler.

In a preferred embodiment, the composite material contains a pigment. This allows the composite material to be given desired visual effects. The at least one pigment can be introduced in different ways, although these are not mutually exclusive, but can optionally also be used jointly.

One way of adding a pigment is to colour the entire mixture with pigment. This is particularly preferred when a homogeneous colour of the composite material is desired. Since the resin is also coloured in this method, a particularly homogeneous colour impression is created.

It is preferred that particles of the first and/or the second filler have a surface coating which changes the visual appearance of the particle, different particle fractions of the filler preferably having surface coatings of the same colour or preferably of different colours and/or a surface coating which changes the light refraction and/or reflection. There is thus the possibility of colouring particles of the filler preferably before producing the (pourable) mixture. This procedure allows particular visual effects which can result in a granite-like or sandstone-like appearance of the composite material. The colour impression of the composite material is not homogeneous, but individual coloured filler particles can be recognised.

It would be conceivable that the particles of the first and the second filler are coloured alike. On the other hand, however, it would also be conceivable that the particles of the first filler have a colour which is different from the particles of the second filler. However, since the upper surface (in the state of use) is substantially characterised by the particles of the first filler, it would also be conceivable to use mixtures of a plurality of differently coloured first fillers. It would be conceivable, for example, that some particles of the first filler have a first colour, other particles of the first filler have a second colour, and yet other particles of the first filler have a third colour or an effect pigment that gives these particles, for example, a particular light refraction or a particular reflectivity.

The surface coating preferably comprises a surface binder. This binder is referred to as a "surface binder" to distinguish it from the binder by means of which the particles of the fillers are fixed in the composite material. If the term "binder" is used in the scope of this invention without specifying a reference system, this refers in each case to the binder by means of which the particles of the fillers are fixed in the composite material. The binder and the surface binder can be identical but are preferably different from one another. The surface binder can be used, for example, to fix pigment particles on the surface of the particles of the first and/or of the second filler. A surface binder which comprises an inorganic component is particularly preferred, particularly preferably an inorganic surface binder. Surprisingly, it was possible to reduce the binder requirement compared to organic surface binders when using an inorganic surface binder.

Alternatively or additionally to setting the visual appearance of the particles, in a preferred embodiment, the binder (of the composite material) contains a pigment which gives the binder a colour which is preferably different from the particles of at least one filler. Thus, the resin can also be provided with pigments in order to give the composite material a uniform base colour which is broken up by the differently coloured filler particles.

It is preferred that there is a significant difference in density (e.g. quartz: approximately 2.5 kg/l to pumice stone approximately 0.7 kg/l or expanded perlite up to 0.1 kg/l) between the second filler (preferably made of glass foam) and the first (preferably hard and solid) filler (e.g. quartz). In the case of an advantageous density of the polymer resin of approximately 1 to 1.2 kg/l, this allows the particles of the second filler not to settle in the matrix (as is usually the case with denser particles), but rather to more or less swim in the liquid resin. In contrast, particles of the first filler of high density sink in the resin because their mobility is large enough. The gradient can be set as a function of the viscosity of the resin and/or the gel time of the resin. In the case of a binder of low viscosity, the concentration of particles of the first filler on the underside of a composite material cast from a mixture of this type will be greatly increased and thus the abrasion resistance will be greatly increased. In the case of a higher viscosity and/or shorter gel time, the gradient could be set flatter and the properties of the composite material could be adapted in the desired manner. A (greater or noticeable) shrinkage of the mixture depleted in first filler particles and lying on top of the casting mould does not occur, since the particles of the second filler are supported against one another. The volume of the interstices can be filled with resin, as a result of which additional stabilisation takes place.

Another substantial aspect of the invention is the use of a composite material as described above as a material for an application selected from a group comprising flooring, wall covering, sanitary product, preferably wash basins or shower trays, furniture construction, kitchen sinks, work surface and worktop, preferably kitchen worktop. Since all of these benefit from the low density of the composite material in combination with the high load-bearing capacity of at least one surface of the composite material, the use of a composite material according to the invention is particularly advantageous for these applications. In principle, however, it would also be conceivable to use the composite material in other applications such as the construction industry, vehicle construction or gardening and landscaping.

In terms of the method, a method comprising the following steps is proposed for the production of a composite material (in particular a composite material as described above):

providing a casting mould,
providing a resin,
providing a first filler which has a density of >2 kg/l and a Mohs hardness of >4,
providing a second filler which differs from the first filler in at least one property and has a bulk density of <2.5 kg/l,
setting a viscosity of the resin at which the mobility of particles of the first filler differs from the mobility of particles of the second filler in the resin,
filling the provided substances into the casting mould,
setting a concentration of the first filler in the resin that decreases in the vertical direction from a base surface of the casting mould by utilising the different mobility of the particles of the first filler and the mobility of the particles of the second filler, and
subsequently hardening the resin to form a composite material.

Using such a method, a composite material having the advantages mentioned above can be produced very easily.

The preferred embodiments described above for the composite material may possibly require corresponding adaptations of this method. These result from the modifications described for the composite material.

The method steps indicated above are preferably carried out in the order indicated. However, this is not absolutely required. For example, it is conceivable that the step of setting the desired viscosity of the resin takes place only after the step of filling the resin into the casting mould.

In a preferred variant of the method, a surface coating which changes the visual appearance of the particles is applied to particles of the first and/or the second filler prior to being mixed with the resin, surface coatings of the same colour or preferably of different colours and/or a surface coating which changes the light refraction and/or reflection preferably being applied to different particle fractions of the filler. This pre-treatment of filler particles can give the composite material a particular visual effect.

Besides or in addition to this, a variant of the method is advantageous in which a pigment is added to the resin that gives the resin a colour which is preferably different from the particles of at least one filler. The addition of this pigment to the resin can be carried out before, after or together with the addition of a filler. The colouring of the resin gives the composite material a desired basic colour, from which, if desired, filler particles are visually separated and thus act as effect particles, for example due to the different colour or increased reflection.

The step of filling the provided substances into the casting mould can also be adapted according to the relevant demands. As indicated below in one of the examples, in a preferred variant of the method, the first and the second filler are mixed with one another and mixed together with the resin. The resin can already be in the casting mould. Alternatively, at least a portion of the resin can be mixed outside the casting mould. It is also conceivable that at least parts (but also the entire amount) of one of the fillers is added to the resin separately from the other filler. For example, in one variant, it is preferred to mix the resin with a filler (and optionally a portion of the other filler) and to put it in the casting mould. The remaining portion of the other filler is only added to the casting mould at a later point in time, preferably at a point in time at which the viscosity of the resin (or the mixture already in the casting mould) has increased. As a result of this increase in viscosity, the mobility of the particles of the filler added later is reduced, so that the formation of the desired gradient of the distribution of the first and second filler is facilitated.

A mixture comprising a resin and approximately 50 vol. % solids content composed of particles of a first and second filler can preferably be used. The spatial separation of the first and second fillers by enrichment or depletion in different regions of the casting mould is preferably carried out gravitationally and can optionally be facilitated and/or controlled by suitable supporting measures such as vibration, application of electric and/or magnetic fields, and setting a predetermined temperature or a predetermined temperature profile during the hardening of the resin.

This local enrichment or depletion usually takes place until the polymer begins to gel. The setting of the viscosity and/or the gel time thus represents a further option for setting the properties of the composite material. In addition, the place of onset and the progression of gelling in the resin can be controlled by suitable process control (for example setting a predetermined temperature profile during gel formation). This also makes it possible (alternatively or additionally to the measures described above) to monitor and control the local enrichment or depletion of the particles of the first and second filler.

Example

A mixture of 90 wt % pumice having a particle size of from 0.25-0.5 mm is mixed with 10 wt % sand having a particle size of from 0.63-0.3 mm. This mixture is mixed with a binder in such a way that the degree of filling is 50-60 wt %. After the composite material produced from it has hardened in a casting mould, an abrasion of only 18 µg per 100 cycles can be determined using the Taber Abrasion Test. The density of the composite material is approximately 1.3-1.4 kg/l. The composite material must be cut dry using a hard metal saw blade without creating sparks.

Further advantages and embodiments can be found in the accompanying figures, in which.

Figure 1:
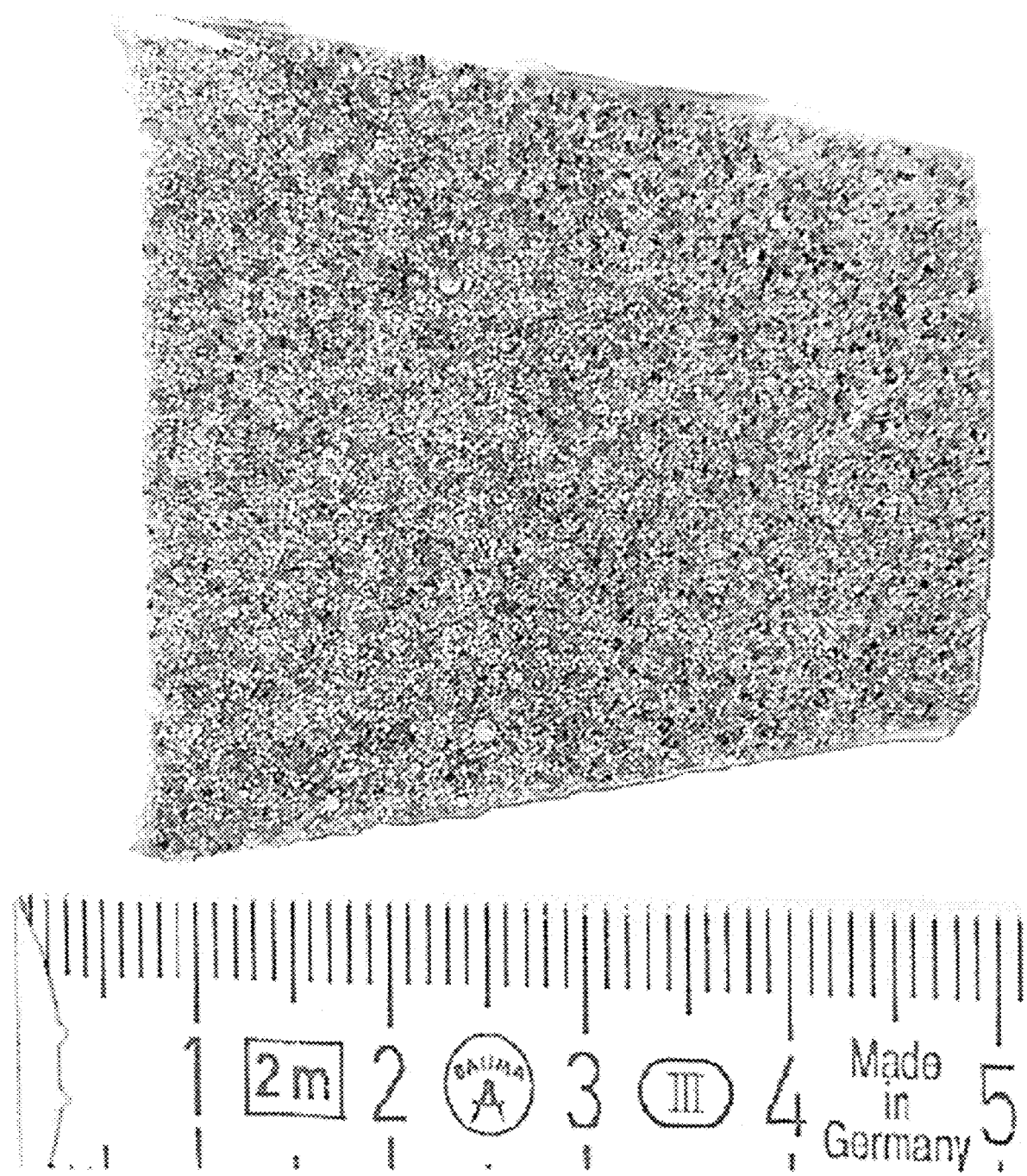
FIG. 1 is a section through a composite material according to the invention in a first embodiment.
Figure 2:
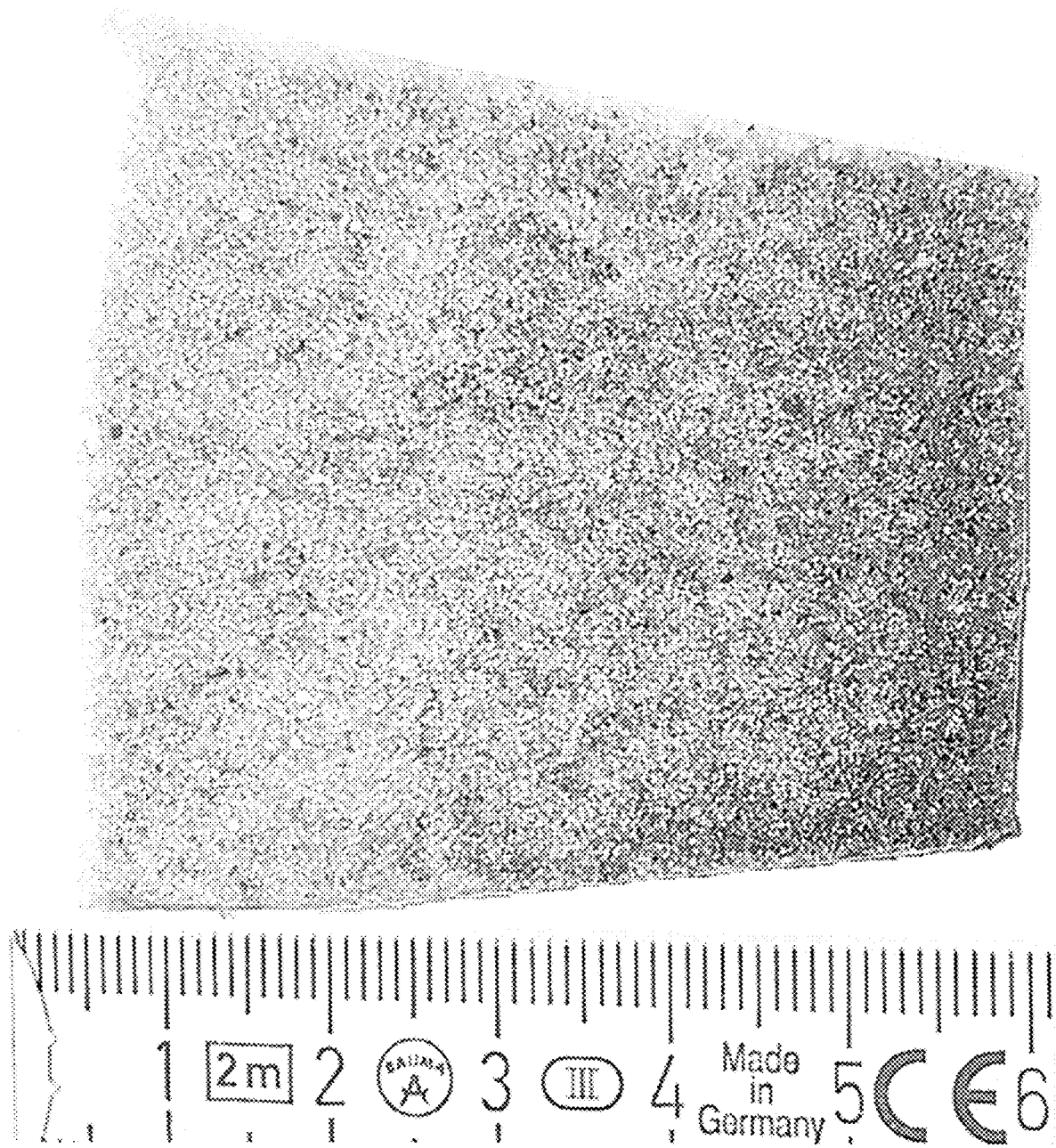
FIG. 2 is a section through a composite material according to the invention in a second embodiment.
Figure 3:
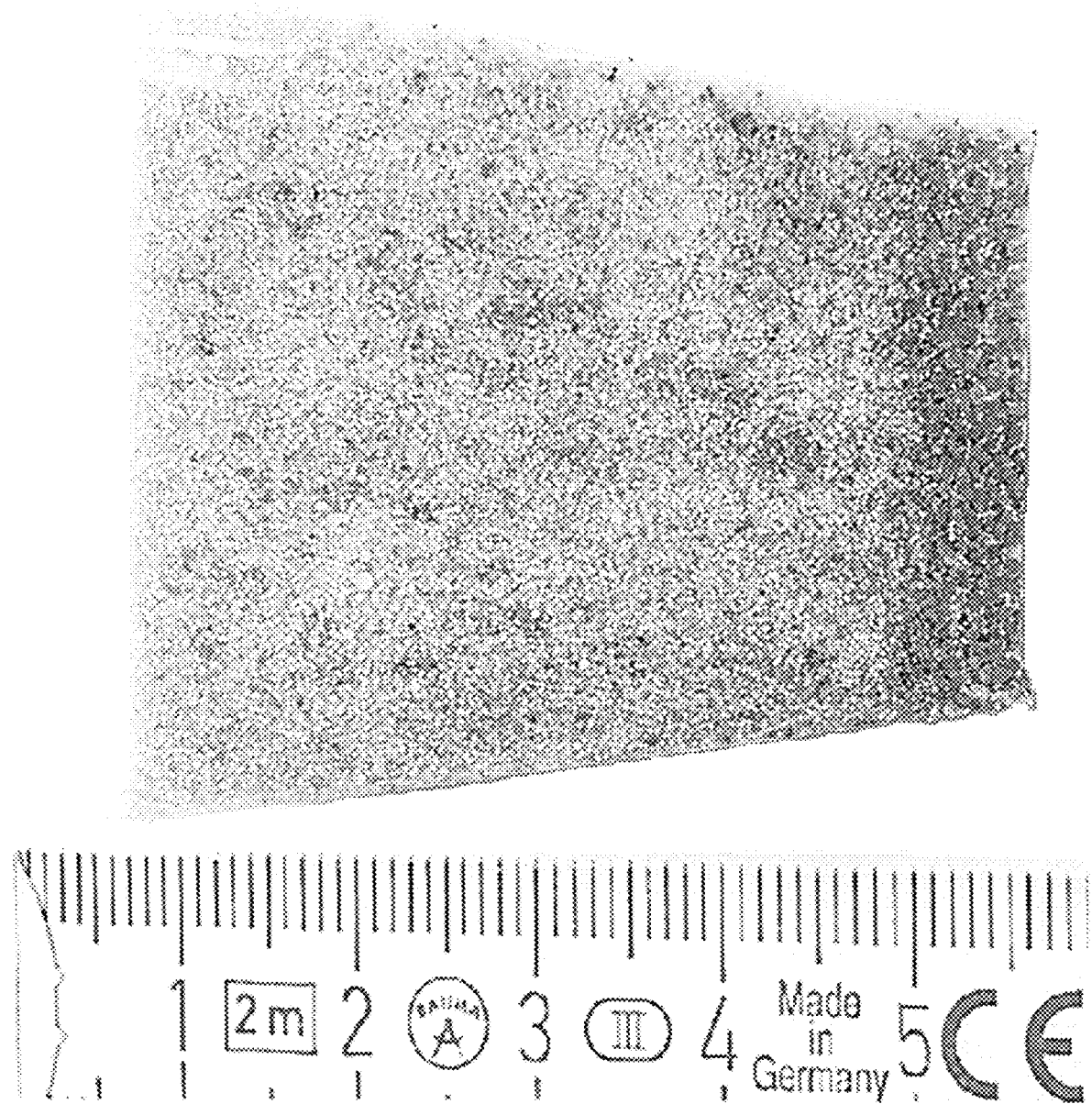
FIG. 3 is a section through a composite material according to the invention in a third embodiment.

In FIG. 1-3, different embodiments of a composite material according to the invention are shown in each case. All embodiments contain dark-coloured sand as the first filler and pumice as the second filler. The binder is identical in each case.

In the embodiments of the composite material according to the invention shown in FIGS. 1 and 2, the first filler and the second filler as well as the binder are each identical. The composite materials shown in FIGS. 1 and 2 nevertheless differ in the course of the gradient by which the concentration of the first (darker) filler decreases with decreasing height. While the gel time of the binder was selected to be extremely short in the composite material shown in FIG. 1, the composite material shown in FIG. 2 is based on a mixture which had a long gel time of the binder. Due to the longer gel time, the mixture shown in FIG. 2 had a comparatively long time available for the enrichment or depletion of the particles of the first and second filler in specific regions of the composite material. Accordingly, the embodiment shown in FIG. 1 has an extremely flat gradient, while the gradient in the embodiment shown in FIG. 2 can be clearly seen.

By comparing the embodiments of the composite material according to the invention shown in FIGS. 1 and 2, the influence of the particle size on the steepness of the gradient can also be seen. The type of first and second fillers is identical (coloured sand), but the average particle size ($d_{50}$ SediGraph) of the first fillers is different in the embodiments of the composite material according to the invention shown in FIGS. 1 and 2. The particles of the first fillers used in the embodiment shown in FIG. 3 have a larger particle size ($d_{50}$ SediGraph) than those of the first fillers in the composite material shown in FIG. 2. In the case of the same gel time of the binder, the larger particle size results in an even steeper gradient in the decrease in the concentration of the particles of the first filler than in the embodiment shown in FIG. 2.

As can be seen from these figures, the gradient of the decrease in the concentration of the particles of the first filler can therefore be influenced not only by the selection of the various different fillers, but also by the viscosity of the mixture, the gel time and the grain size distribution of the first filler and can be set according to the specifications on each composite material.

The applicant reserves the right to claim all the features disclosed in the application documents as essential to the invention, provided that these are novel, individually or in combination, over the prior art.

The invention claimed is:

1. A composite material comprising a binder and at least one first and at least one second filler,
   the first filler having a density of >2 kg/l and a Mohs hardness of >4 and
   the second filler having a bulk density of <2.5 kg/l, wherein the particles of the second filler are selected from a group consisting of hollow polymer spheres, polymer granules, hollow glass spheres, synthetic porous glass or ceramic spheres, zeolite, aluminium trihydroxide (ATH), expanded perlite, and pumice stone,
   wherein the concentration of the first filler in the composite material decreases starting from a first surface of the composite material in the direction of an opposite second surface of the composite material.

2. The composite material according to claim 1, wherein the decrease in the concentration of the first filler in the composite material starting from the first surface of the composite material in the direction of the second surface is described by a continuous function.

3. The composite material according to claim 1, wherein the function is an exponential function having a base <1.

4. The composite material according to claim 1, wherein the increase in the concentration of the second filler in the composite material starting from the first surface of the composite material in the direction of the second surface of the composite material is described by a continuous function.

5. The composite material according to claim 1, wherein the function is an exponential function having a base >1.

6. The composite material according to claim 1, wherein particles of the first filler and the particles of the second filler differ in at least one property which allows a separation and/or an enrichment or a depletion within predetermined regions of the composite material before its hardening.

7. The composite material according to claim 1, wherein the distinguishing property is selected from a group comprising density, grain size (Sedi-Graph), morphology, and contact angle to the binder.

8. The composite material according to claim 1, wherein the concentration of the first filler in the composite material decreases along a height direction of the composite material, the composite material having an extension in the height direction of ≤10 cm.

9. The composite material according to claim 1, wherein the first and/or second filler(s) comprise(s) an isotropic granular material.

10. The composite material according to claim 1, wherein the binder is a viscous resin which has a viscosity of ≥100 mPa·s and ≤5,000 mPa·s.

11. The composite material according to claim 10, wherein the resin comprises an acrylic resin and/or a polyester resin and/or a polyurethane resin.

12. The composite material according to claim 1, wherein a change in the coefficient of thermal expansion starting from the first surface of the composite material in the direction of the second surface of the composite material has a continuous course.

13. The composite material according to claim 1, wherein the first filler has a particle size (d50 SediGraph) of ≥01 μm and ≤500 μm.

14. The composite material according to claim 1, wherein particles of the first and/or the second filler have a surface coating which changes the visual appearance of the particle.

15. The composite material according to claim 14, wherein different particle fractions of the filler have surface coatings of the same colour or different colours and/or a surface coating which changes the light refraction and/or the reflection.

16. The composite material according to claim 1, wherein the binder contains a pigment which gives the binder a colour that is different from the particles of at least one filler.

17. A material comprising the composite material of claim 1, wherein the material is selected from a group comprising flooring, wall covering, sanitary product, wash basins or shower trays, furniture construction, kitchen sinks, work surface, and worktop.

18. A method for producing a composite material, comprising the steps of:
providing a casting mould,
providing a resin,
providing a first filler which has a density of >2 kg/l and a Mohs hardness of >4,
providing a second filler which differs from the first filler in at least one property and has a bulk density of <2.5 kg/l, wherein the particles of the second filler are selected from a group consisting of hollow polymer spheres, polymer granules, hollow glass spheres, synthetic porous glass or ceramic spheres, zeolite, aluminium trihydroxide (ATH), expanded perlite, and pumice stone,
setting a viscosity of the resin at which the mobility of particles of the first filler differs from the mobility of particles of the second filler in the resin,
filling the provided substances into the casting mould,
setting a concentration of the first filler in the resin that decreases in the vertical direction from a base surface of the casting mould by utilising the different mobility of the particles of the first filler and the mobility of the particles of the second filler, and
subsequently hardening the resin to form a composite material.

19. The method for producing a composite material according to claim 18, wherein
a surface coating which changes the visual appearance of the particles is applied to particles of the first and/or the second filler before being mixed with the resin.

20. The method for producing a composite material according to claim 18, wherein a pigment is added to the resin that gives the resin a colour which is different from the particles of at least one filler.

\* \* \* \* \*